United States Patent
Zhang

(10) Patent No.: US 10,587,587 B2
(45) Date of Patent: Mar. 10, 2020

(54) INFORMATION PROCESSING APPARATUS AND INFORMATION PROCESSING METHOD

(71) Applicant: Sony Corporation, Tokyo (JP)

(72) Inventor: Zhihui Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 289 days.

(21) Appl. No.: 15/450,141

(22) Filed: Mar. 6, 2017

(65) Prior Publication Data

US 2017/0359315 A1 Dec. 14, 2017

(30) Foreign Application Priority Data

Jun. 14, 2016 (CN) .......................... 2016 1 0416825

(51) Int. Cl.
*H04L 29/06* (2006.01)
*B29C 64/386* (2017.01)
*B33Y 50/00* (2015.01)

(52) U.S. Cl.
CPC ........ *H04L 63/0428* (2013.01); *B29C 64/386* (2017.08); *B33Y 50/00* (2014.12)

(58) Field of Classification Search
CPC ..... H04L 63/0428; B33Y 50/00; B33Y 50/02; B29C 64/386; B29C 64/00; B29C 64/10; B29C 64/171; B29C 64/393; B29C 64/40; G06F 21/608
See application file for complete search history.

(56) References Cited

U.S. PATENT DOCUMENTS 8,880,875 B1 *  11/2014  Waters ................. H04L 9/3073
                                                        713/155
8,934,994 B1 *   1/2015  Lee .................... G05B 19/4099
                                                         700/47
9,604,406 B2 *   3/2017  Mahdavi ................ G06Q 50/04
(Continued)

OTHER PUBLICATIONS

Goyal et al. Attribute-Based Encryption for , Fine-Grained Access Control of Encrypted Data, CCS'06, Oct. 30-Nov. 3, 2006, Alexandria, Virginia, USA. Copyright 2006 ACM 1-59593-518-5/06/0010 (Year: 2006).*

(Continued)

*Primary Examiner* — Ali S Abyaneh
*Assistant Examiner* — Shu Chun Gao
(74) *Attorney, Agent, or Firm* — Xsensus LLP

(57) ABSTRACT

An information processing apparatus according to an embodiment includes a processing circuit configured for: acquiring information of 3D printing devices which are competent to a 3D print task, where the information includes attribute features of the 3D printing devices that can be used for an attribute-based decryption; determining, based on the acquired information, an encryption attribute set or a decryption logic setting for performing an attribute-based encryption on data of the 3D print task, where the encryption attribute set or the decryption logic setting covers a specified number of the 3D printing devices and has a low encryption overhead for the data; performing the attribute-based encryption on the data using the determined encryption attribute set or decryption logic setting to obtain encrypted data; and performing control to release the encrypted data as a 3D print task.

11 Claims, 14 Drawing Sheets

(56) References Cited

U.S. PATENT DOCUMENTS

| | | | |
|---|---|---|---|
| 2014/0156053 A1* | 6/2014 | Mahdavi | G06Q 50/04 |
| | | | 700/119 |
| 2014/0289513 A1* | 9/2014 | Huang | H04L 63/0428 |
| | | | 713/160 |
| 2015/0074398 A1* | 3/2015 | Cullen | H04L 63/0428 |
| | | | 713/168 |
| 2015/0142153 A1* | 5/2015 | Chun | B29C 64/40 |
| | | | 700/98 |
| 2015/0205544 A1* | 7/2015 | Webb | G06F 3/126 |
| | | | 358/1.15 |
| 2017/0150004 A1* | 5/2017 | Webb | G06F 3/126 |
| 2017/0324711 A1* | 11/2017 | Feeney | H04L 63/0428 |
| 2018/0001567 A1* | 1/2018 | Juan | B22F 3/1055 |
| 2018/0029298 A1* | 2/2018 | Takaya | G06F 17/50 |
| 2018/0353308 A1* | 12/2018 | Tompkins | A61F 2/50 |
| 2018/0354034 A1* | 12/2018 | Vaes | B33Y 10/00 |
| 2019/0077084 A1* | 3/2019 | Granados Asensio | |
| | | | B33Y 30/00 |

OTHER PUBLICATIONS

Cygnusv, What is Attribute Based Encryption?, Jun. 25, 2014 at 21:09 , https://crypto.stackexchange.com/questions/17893/what-is-attribute-based-encryption (Year: 2014).*

* cited by examiner

INFORMATION PROCESSING APPARATUS AND INFORMATION PROCESSING METHOD

FIELD

The present disclosure generally relates to information processing, and in particular to an information processing apparatus and an information processing method for distributed 3D printing.

BACKGROUND 3D printing technology, also referred to as additive manufacturing (AM) technology, rapid prototyping manufacturing technology or stereo lithography technology, is a technology which fabricates a 3D object according to a 3D model with assistance of a computer. A 3D printer is a machine using an accumulated manufacturing technology i.e., the rapid prototyping technology, which prints multiple layers of adhesive materials to manufacture a 3D object based on a digital model file.

For 3D printing, there may be a demand for printing in bulk. In addition, due to security and privacy protection, one 3D design model may need to be decomposed into several components, the components are printed by different 3D printers, and then the printed components are assembled to form a complete 3D object.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an information processing apparatus is provided, which includes a processing circuit configured for: acquiring information of 3D printing devices which are competent to a 3D print task, where the information includes attribute features of the 3D printing devices that are capable of applying to an attribute-based decryption; determining, based on the acquired information, an encryption attribute set or a decryption logic setting for performing an attribute-based encryption on data of the 3D print task, and the encryption attribute set or the decryption logic setting covers a specified number of the 3D printing devices and has a low encryption overhead for the data; performing the attribute-based encryption on the data using the determined encryption attribute set or decryption logic setting to obtain encrypted data; and performing control to release the encrypted data as a 3D print task.

According to another embodiment, an information processing method is provided, which includes: acquiring information of 3D printing devices which are competent to a 3D print task, where the information includes attribute features of the 3D printing devices that are capable of applying to an attribute-based decryption; determining, based on the acquired information, an encryption attribute set or a decryption logic setting for performing an attribute-based encryption on data of the 3D print task, where the encryption attribute set or the decryption logic setting covers a specified number of the 3D printing devices and has a low encryption overhead for the data; performing the attribute-based encryption on the data using the determined encryption attribute set or decryption logic setting to obtain encrypted data; and releasing the encrypted data as a 3D print task.

According to another embodiment, an information processing apparatus is provided, which includes a processing circuit configured for: performing control to receive encrypted data for a 3D task, where the data is attribute-based encryption using an encryption attribute set or a decryption logic setting, and where the encryption attribute set or decryption logic setting covers a specified number of 3D printing devices and has a low encryption overhead for the data; and decrypting the data using a decryption key based on attribute features.

According to another embodiment, an information processing method is provided, which includes: receiving encrypted data for a 3D print task, where the data is attribute-based encrypted using an encryption attribute set or a decryption logic setting, and where the encryption attribute set or decryption logic setting covers a specified number of 3D printing devices and has a low encryption overhead for the data; and decrypting the data using a decryption key based on attribute features.

According to the embodiment of the present disclosure, data can be encrypted and transmitted safely from the 3D print service device to the distributed 3D printer device. With the information processing apparatus or the information processing method according to the embodiment of the present disclosure, the overhead for encrypting 3D print data can be reduced.

BRIEF DESCRIPTION OF THE DRAWINGS

The present disclosure can be understood better with reference to the description given in conjunction with the drawings in the following. The same or similar element is indicated by the same or similar reference numeral throughput all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF THE EMBODIMENTS

Figure 1:
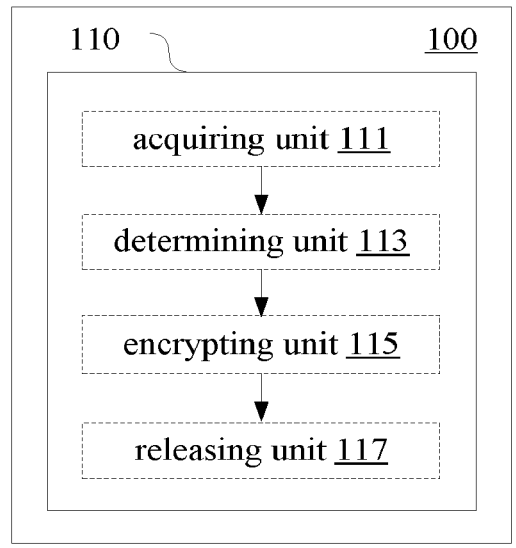
FIG. 1 shows a block diagram of a configuration example of an information processing apparatus according to an embodiment of the present disclosure.

Hereinafter embodiments of the present disclosure are illustrated with reference to the drawings. Elements and features described in one drawing or one embodiment of the present disclosure may be combined with elements and features shown in one or more other drawings or embodiments. It should be noted that, for clarity, indication and description of components and processing which are not related to the present disclosure or known for those skilled in the art are omitted in the drawings and illustration.

As shown in FIG. 1, a wireless communication apparatus 100 according to an embodiment includes a processor 110. The processor 110 includes an acquiring unit 111, a determining unit 113, an encrypting unit 115 and a releasing unit 117. It should be noted that, although the acquiring unit 111, the determining unit 113, the encrypting unit 115 and the releasing unit 117 are shown in a form of functional modules in FIG. 1, it should be understood that, functions of respective components in the processor 110 may be achieved by the processor 110 as a whole, and are not necessarily achieved by discrete actual components in the processor 110. In addition, the processor 110 is shown by one block in FIG. 1, but the communication apparatus 100 may include multiple processors and functions of the acquiring unit 111, the determining unit 113, the encryption unit 115 and the releasing unit 117 may be distributed to multiple processors, thereby performing the functions by operating in cooperation by the multiple processors.

The acquiring unit 111 is configured to acquire information of 3D printing devices capable of performing a 3D print task, where the information includes attribute features of the 3D printing devices that can be used for an attribute-based decryption.

The 3D printing devices capable of performing the 3D print task may include 3D printing devices registered in advance at the information processing apparatus 100. In this case, registration information obtained in advance is maintained at the information processing apparatus 100. For a specific print task, information of 3D printing devices capable of performing the task may be acquired according to the registration information. In addition, as illustrated in combination with specific embodiments later, information of the 3D printing devices capable of performing a 3D print task may be obtained in a real-time manner by broadcasting the print task and receiving a response.

Hereinafter, attribute-based encryption is introduced briefly.

With the development of the internet and distributed computing technology, requirements for data sharing and processing in the distributed and open computing environment are increasing. A resource provider needs to establish flexible and extendable access control strategies, thereby controlling a shared range of data and ensuring confidentiality of data during a process of communicating with a user. A large scale distributed application needs to support one-to-multiple communication mode urgently, thereby reducing great overhead due to encrypting data for each user. The concept of broadcast encryption was first put forwarded by Fait et al, and was applied to a scene where a ciphertext is transmitted to a group of users. The core concept of a broadcast encryption system is that: a broadcaster encrypts a message and transmits the encrypted message to many users by broadcasting, and only legal authorized users can decrypt and obtain the real information. The conventional encryption mechanism based on a public key infrastructure (referred to as PKI for short) can ensure confidentiality of data, but has the following defects: firstly, a resource provider needs to acquire a real public key certificate of a user, otherwise encryption cannot be performed; secondly, the resource provider needs to receive a public key encryption message from each user in a group and transmits a ciphertext to a respective user, thereby resulting in a great processing overhead and a large occupation of bandwidth; and thirdly, although the problem of efficiency is solved partially by the broadcast encryption technology, the resource provider is required to acquire a user list before encryption, and thus generating two secondary problems: the distributed application is difficult to acquire the scale of the receiving group and identities of members at one time, and the privacy of the user is damaged when the distributed application lists the identities of the users. In an Attribute-Based Encryption (referred to as ABE for short) mechanism uses attributes as a public key, a ciphertext and a private key of the user are associated with the attributes, access control policies can be represented flexibly, thereby greatly reducing the network bandwidth and processing overheads for the transmitting node caused by data sharing fine-grained access control.

In addition, for the ABE mechanism, the following documents may be referred to:

Attribute-Based Encryption Schemes, Journal of Software, 2011, 22(6):1299-1315;

Shamir A. Identity-Based cryptosystems and signature schemes. In: Blakley G R, Chaum D, eds. Advances in CryptologyCRYPTO'84. Berlin, Heidelberg: Springer-Verlag, 1984. 47-53;

Sahai A, Waters B. Fuzzy identity-based encryption. In: Cramer R, ed. Advances in Cryptology-EUROCRYPT 2005. Berlin, Heidelberg: Springer-Verlag, 2005. 457-473;

Goyal V, Pandey O, Sahai A, Waters B. Attribute-Based encryption for fine-grained access control of encrypted data. In: Proc. Of the 13th ACM Conf. on Computer and Communications Security. New York: ACM Press, 2006. 89-98;

Bethencourt J, Sahai A, Waters B. Ciphertext-Policy attribute-based encryption. In: Proc. of the 2007 IEEE Symp. on Security and Privacy. Washington: IEEE Computer Society, 2007. 321-334.

The ABE mechanism has the following features: firstly, the resource provider encrypts a message according to only attributes, without considering the number and identities of members in a group, thereby reducing a data encryption overhead and protecting user privacy; secondly, only the members meeting the ciphertext attribute requirement can decrypt the message, thereby ensuring data confidentiality; thirdly, in the ABE mechanism, a user key is related to a random polynomial or a random number, and keys of different users cannot be combined, thereby preventing collusion attack of the users; and fourthly, the ABE mechanism supports flexible access control policies based on attributes, thereby achieving AND, OR, NOT and gate operations of attributes.

The ABE belongs to a public key encryption mechanism, and a decryption object thereof is a group rather than a single user. The key point for achieving the feature is to introduce the concept of attributes. The attributes are information elements describing the user. For example, a student in a campus network has attributes such as a department, a student type, a grade and a major, and a teacher has attributes such as a department, a title and a teaching age. A group refers to a set of users having a combination of certain attribute values. For example, undergraduates of a computer college refer to a group of which a department attribute value is computer college and a student type attribute is undergraduate. The ABE uses a combination of attributes of the group as a public key of the group, and all users transmit data to the group using the same public key. In the above example, {computer college, undergraduate} function as a public key for transmitting a ciphertext to undergraduates of the computer college. Private keys are calculated by an attribute authority according to user attributes and assigned to respective users.

According to the embodiment of the present disclosure, for security or copyright protection, for example, 3D print data is transmitted to respective on-line 3D printer terminals in a form of encryption broadcast. Any user may access to a distributed 3D printing system by registering a 3D network printing device or a local 3D printing device, such that a 3D printing device of the user participates in an operation of the distributed 3D printing system when the 3D printing device is vacant. In this way, the 3D printing device is utilized efficiently, thereby printing in bulk can be realized.

The application of the attribute-based encryption technology to the distributed 3D printing platform relates to different models of 3D printers, and data formats, e.g., slice file formats, supported by respective printers may be different. In addition, different key generation centers (KGC), i.e., a third party security support platform, provide device decryption keys for 3D printing terminals based on different parameters or policies. Therefore, the distributed 3D print service end needs to process 3D printers of different groups when assigning a print task. The embodiments of the present disclosure mainly focus on encryption attribute assignment and management for scheduling a task, such that transmission is performed using the minimum number of times of encryption and the smallest bandwidth.

Figure 18:
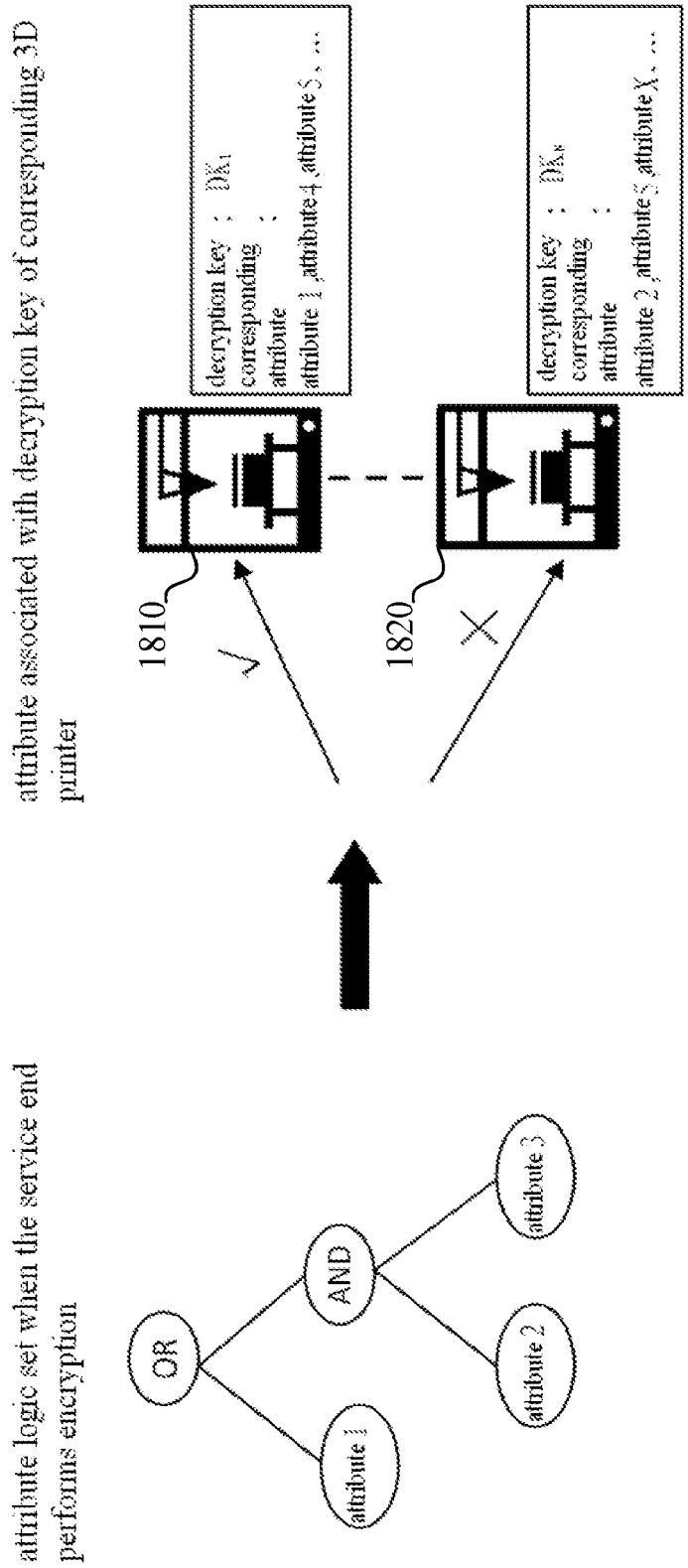
FIG. 18 shows a schematic diagram of an example of a relationship between 3D print data encryption and 3D printer attributes.
Figure 19:
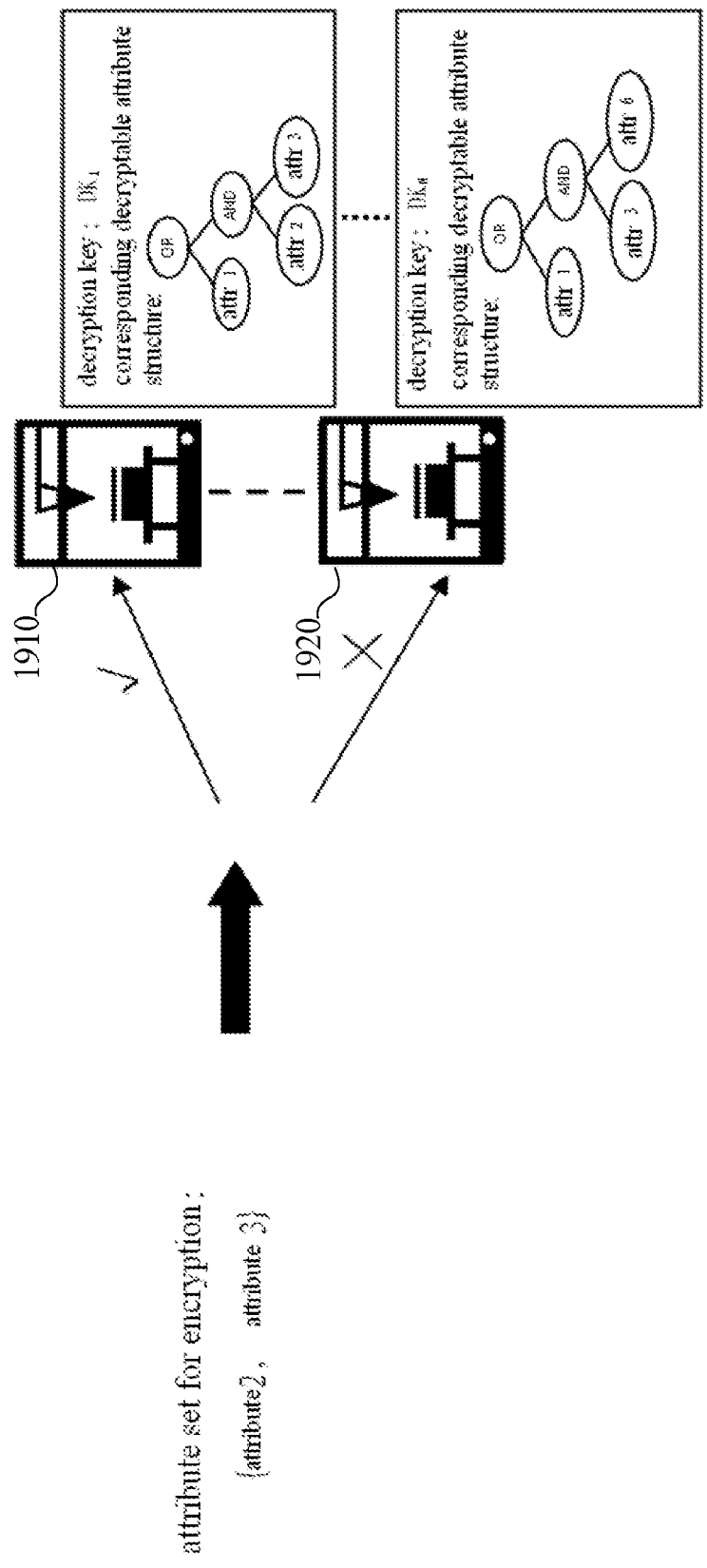
FIG. 19 shows a schematic diagram of another example of a relationship between the 3D print data encryption and the 3D printer attributes.

FIG. 18 and FIG. 19 respectively show examples of a relationship between 3D print data encryption and 3D printer attributes (corresponding to so-called ciphertext policy and key policy respectively).

As shown in FIG. 18, encrypted data broadcasted to multiple 3D printing devices includes attribute logic to be met by a decryption end which is set by a print service end when encrypting. The 3D printing devices each have an attribute associated with a decryption key. A 3D printing device 1810 with an attribute matching the attribute logic can decrypt the encrypted data, and a 3D printing device 1820 without the attribute matching the attribute logic cannot decrypt the encrypted data.

As shown in FIG. 19, encrypted data broadcasted to multiple 3D printing devices includes an attribute set which is set by a print service end when encrypting, and the 3D printing devices each have an attribute structure associated with the decryption key. A 3D printing device 1910 with an attribute structure matching the attribute set can decrypt the encrypted data, and a 3D printing device 1920 without an attribute structure matching the attribute set cannot decrypt the encrypted data.

Referring to FIG. 1 again, the determining unit 113 is configured to determine, based on the information acquired by the acquiring unit 111, an encryption attribute set or a decryption logic setting for performing an attribute-based encryption on data of the 3D print task (for example, respectively corresponding to the key policy and the ciphertext policy described previously), where the encryption attribute set or the decryption logic setting covers a predetermined number of the 3D printing devices and has a low encryption overhead for the data. The predetermined number corresponds to the printing number of a bulk printing tasks, for example.

In addition, the encryption overhead may for example include: the number of times of encryption operations to be performed for the predetermined number of the 3D printing devices, and/or a communication bandwidth required for transmitting the encrypted data. Generally, the number of encryption operations to be performed corresponds to the number of encrypted data to be transmitted by broadcasting, therefore the smaller the number of encryption operations is, the less the communication resources are required.

The determination of an encryption attribute set or a decryption logic setting substantially corresponds to: grouping the 3D printing devices based on the attribute features of the 3D printing devices, where each group of the 3D printing devices corresponds to a common encryption operation.

According to an embodiment, the determination of a decryption logic setting includes:
  a) setting a root as an OR logic;
  b) selecting a greatest common divisor attribute as a first-level logic input of the OR logic, the root having only one first-level logic input if the greatest common divisor attribute is capable of covering an overall 3D print task amount, where the greatest common divisor attribute is an attribute common to a largest number of 3D printing devices in one print task; and c) if the number of the 3D printing devices under coverage of the root is less than the 3D print task amount, further configuring another first-level logic input of the OR logic of the root until the number of the 3D printing devices under coverage of the root matches the 3D print task amount.

In addition, if the number of 3D printing terminal sets with the greatest common divisor attribute is greater than a print task demand, constraints need to be performed for the remaining attributes using AND logic. That is, in a case that the root has only one first-level logic input and the number of 3D printing devices corresponding to the first-level logic input is larger than the 3D print task amount, the operation b) further includes: performing a next-level logic configuration for the first-level logic input, such that the number of the 3D printing devices corresponding to the first-level logic input matches the 3D print task amount.

Accordingly, the number of times of the encryption performed on the data corresponds to the number of first-level logic inputs of the root.

Figure 20:
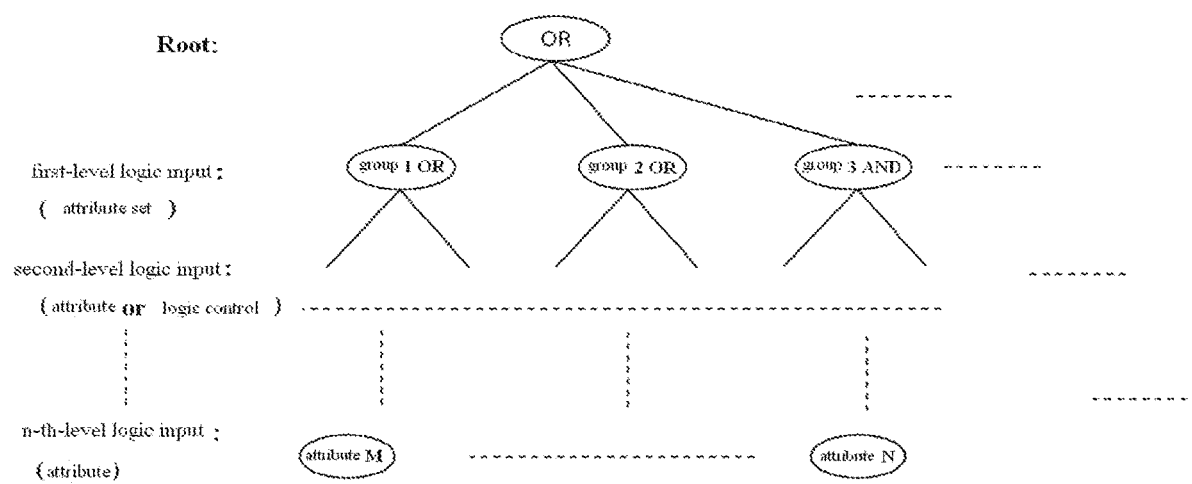
FIG. 20 shows a schematic diagram for illustrating an example of an encryption control logic.

FIG. 20 shows an example of encryption control logic. In which, a root is OR logic, and each first-level logic corresponds to one encryption group, and the lowest end of the logic structure correspond to respective specific attributes.

In addition, for encrypting a non-3D model file, i.e., in a case of encrypting a slice file, slice files may be not compatible for 3D printers of different manufactures/models, therefore the type of slices may be taken as a control factor. That is, the type of slice files is considered when the first-level logic input of root is generated. If multiple types of slice formats which are not compatible appear in a same print task, the first-level logic input amount of the root is further divided, i.e., increasing an encryption task amount and a transmission bandwidth of the 3D print service end. The 3D print service end encrypts in a real-time manner according to the number of the first-level logic inputs of the root, i.e., generating the same number of ciphertexts as the number of the first-level inputs.

Figure 22:
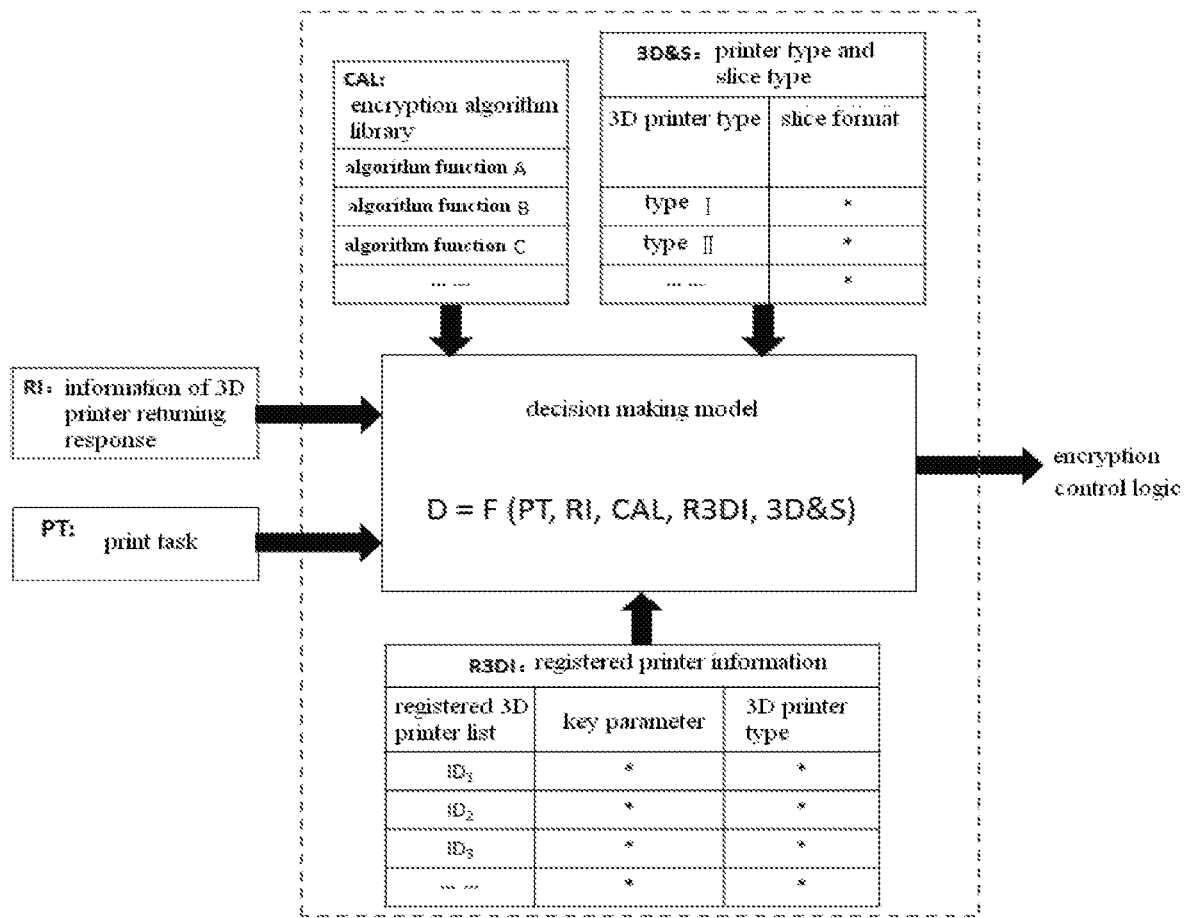
FIG. 22 shows a schematic diagram of a processing performed by a decision model for generating an encryption control logic.

The determining process described above may be completed by a decision making model. That is, the decision making model sets an attribute set for encryption or ciphertext access control logic according to a print task and information of an on-line 3D printing terminal. As shown in FIG. 22, an input of the decision making model is 3D printer information and a print task. The decision making model may be configured with an encryption algorithm library, registration information of the 3D printer terminal, and a type of the 3D printer and a corresponding slice format and so on. The input of the decision making model is attribute encryption control logic. In order to achieve the least encryption operation and the smallest communication bandwidth, the print service end temporarily combines, according to the parameter information of the 3D printer terminal, on-line 3D printer terminals for a print task by controlling the attributes, and the number of combined 3D printer terminals is the least number of times of encryption of the 3D model print task.

Returning to FIG. 1, the encrypting unit 115 is configured to perform attribute-based encryption on data using the encryption attribute set or decryption logic setting determined by the determining unit 113, so as to obtain encrypted data.

As described above, the 3D print data may include a 3D model file or a slice file generated based on a 3D model file.

Hereinafter the 3D model file is introduced briefly. An important step of the 3D print is modeling, which may be done by creating a 3D model using related 3D software by a computer, or directly generating a prototype of an electronic model by scanning an existing object and then correcting the prototype with auxiliary design software. For the designing works and the process of transmitting and printing, certain measures for ensuring information security are needed to avoid the works being copied in a malicious way and printed arbitrarily. Presently, a 3D model file format most widely applied is a Stereo Lithography (STL) file. The STL file format is a 3D graph file format serving for a rapid prototype manufacturing technology. A STL file is composed of definitions of multiple triangular patches. A definition of each triangular patch includes 3D coordinates of each vertex of a triangle and a normal vector of the triangular patch. After the STL model file is imported to control software of the 3D printer, firstly parameters such as temperature, speed, fill rate and thickness are set, and then the slices are converted into Gcode codes controlling an operation of the device, i.e., G codes, which control each print action of a 3D printer.

Referring to FIG. 1 again, the releasing unit 117 is configured to perform control to release the encrypted data obtained by the encrypting unit 115 as a 3D print task.

After the encryption is completed, the 3D print service end broadcasts an encrypted data file to be printed on a network. A distributed 3D printer terminal on the network receives the broadcasted information, finds an attribute matching its ID/device key, extracts a corresponding ciphertext, and decrypts using the device key to obtain plaintext information of the 3D model file/3D slice file to be printed, so as to complete a corresponding print task. After completing the 3D printing, the distributed 3D printer terminal transmits print completion response information to the 3D print service device, thereby ending a task period of the 3D printer terminal.

As described above, according to an embodiment, information of the 3D printing device capable of performing a 3D print task may be obtained by broadcasting the print task and receiving a response. Subsequently, the embodiment is illustrated with reference to FIG. 2.

Figure 2:
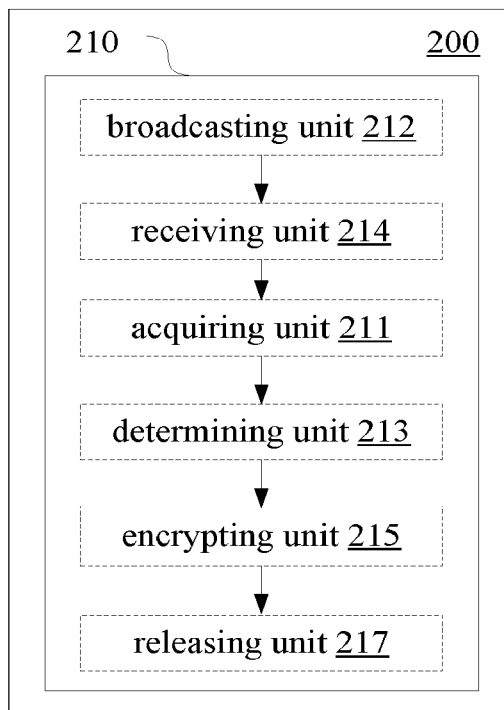
FIG. 2 shows a block diagram of a configuration example of an information processing apparatus according to another embodiment of the present disclosure.

As shown in FIG. 2, an information processing apparatus 200 according to the embodiment includes a processing circuit 210. The processing circuit 210 includes a broadcasting unit 212, a receiving unit 214, an acquiring unit 211, a determining unit 213, an encrypting unit 215 and a releasing unit 217.

The broadcasting unit 212 is configured to perform control to broadcast a demand of a 3D print task via a network.

The receiving unit 214 is configured to perform control to receive a response of a 3D printing device to the demand.

The 3D printing device making the response to the broadcasted print demand functions as a device capable of performing a 3D print task, and the acquiring unit 211 may acquire the information of the 3D printing device for subsequent processing. Specific configurations of the acquiring unit 211, the determining unit 213, the encrypting unit 215 and the releasing unit 217 are similar to that of the acquiring unit 111, the determining unit 113, the encrypting unit 115 and the releasing unit 117 described with reference to FIG. 1, which are not repeated here.

According to another embodiment, in a case that the number of available 3D printing devices is greater than a 3D print task amount, the 3D printing devices may be selected.

Figure 3:
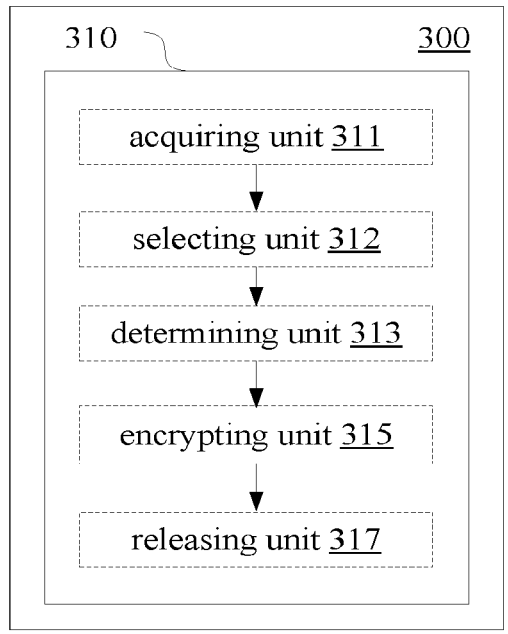
FIG. 3 shows a block diagram of a configuration example of an information processing apparatus according to another embodiment of the present disclosure.

As shown in FIG. 3, an information processing apparatus 300 according to an embodiment includes: an acquiring unit 311, a selecting unit 312, a determining unit 313, an encrypting unit 315 and a releasing unit 317. The acquiring 311, the determining unit 313, the encrypting unit 315 and the releasing unit 317 are similar to the acquiring unit 111, the determining unit 113, the encrypting unit 115 and the releasing unit 117 described with reference to FIG. 1, which are not repeated here.

The selecting unit 312 may be configured to, in a case where the number of 3D printing devices capable of performing a 3D print task is larger than the 3D print task amount, select 3D printing devices for the present 3D print task according to 3D print tasks previously performed by the 3D printing devices and/or an estimated performing time of the present 3D print task. The 3D print tasks previously performed by a 3D printing device can reflect a credit of the 3D printing device to a certain degree. Accordingly, the selecting unit 312 may select a 3D printing device which performs more 3D print tasks previously. On the other hand, the estimated performing time of the present 3D print task can reflect a capability or efficiency for performing the print task by the 3D printing device. Accordingly, the selecting unit 312 may select a 3D printing device having a shorter estimated performing time of the present 3D print task.

Alternatively, the selecting unit 312 may be configured, in a case where the number of 3D printing devices capable of performing a 3D print task is larger than the 3D print task amount, select 3D printing devices for the 3D print task according to the number of attribute features of the 3D printing devices that can be used for attribute-based decryption. The greater the number of attribute features of the 3D printing devices that can be used for attribute-based decryption is, the greater a probability that the determining unit 313 obtains less encryption groups is. Therefore, selecting the 3D printing device according to the number of attribute features can be beneficial to further reduce the number of encryption operations.

The selecting unit 312 may select a 3D printing device using a method of an operational research, for example. Specific content of the operational research includes: programming theory (including linear programming, non-linear programming, integral programming and dynamic programming), a graph theory, a decision theory, a queuing theory, an inventory theory and a reliability theory. The most central problem of the operational research is to obtain an optimum solution to a problem.

Optimization algorithms in the operational research are generally classified into two categories: an accurate algorithm and an approximation algorithm (also referred to as a heuristic algorithm). The accurate algorithm includes: divide-and-conquer (searching and sorting and so on), dynamic programming (path planning, triangulation and knapsack); and branch and bound (integral linear programming, job scheduling and so on). The approximation algorithm or the heuristic algorithm includes: a greedy policy (minimum spanning tree, max-sat and so on); local search (maximum matching and so on); an integral programming method; a random method; an on-line algorithm (paging, k-server, packing and so on) and so on.

With specific manners in the operational research, task scheduling of the distributed 3D printer can be modeled, and then solved, so as to achieve the optimum task scheduling.

It is assumed that the number of on-line available network printers is N, the number of current print task demands is M, and M≤N.

Taking attribute-based encryption of a ciphertext policy as an example, device decryption keys of 3D printer terminals are bound to a set of attributes Set (Attr), indicated as $set_i$, i=1, . . . , N, and different key management centers set corresponding attribute sets for the device decryption keys generated for the 3D printer terminals. It is assumed that device decryption keys of N network printers are released by K different KGCs, and the decryption keys cannot be mixed.

It is assumed that T(x) indicates a time cost of print tasks completed by each network 3D printer terminal and $t(x, r_i)$ indicates printing time for performing the present print task in this case, the most appropriate M of N available network printer terminals may be selected to participate in the print task. It is assumed that H is a dynamic threshold which is related to the print task amount. The M optimum 3D printer terminals S may be selected from the following model:

$$T(s)-t(s,r_i)=\{T(x)-t(x,r_i)|x\}\geq H.$$

In the example, both the time cost of the completed print tasks (corresponding to the amount of printing tasks performed previously described above) and printing time for performing the present printing task (corresponding to the estimated performing time of the present 3D print task described above) are considered. However, it is also feasible to consider only one of them.

After the M 3D printer terminals are selected, attribute sets for encryption may be determined by the attribute decision making model.

It is assumed that A(x) indicates an attribute set space of KGC, and $a(x, r_i)$ indicates an attribute set space owned by 3D printer terminals performing the present print task ($r_i$), in this case, 3D printer terminals with different numbers of attribute elements may be selected by the following model:

$$Att(s)-a(s,r_i)=\min\{Att(x)-a(x,r_i)|x\}.$$

In addition, in a case of not considering a time cost T(x) of completed print tasks of each 3D printer terminal, i.e., not considering the previous credit, the most appropriate M network printer terminals participating in the print task may be selected from the N available network printer terminals by directly using the second model. This is a greedy method in the operational research, i.e., directly searching for the largest available set. Theoretically, the more the elements in the attribute set of the 3D printer terminals are, (i.e., the smaller the Att(x)–a(x, $r_i$) is), the greater a probability that all 3D printer terminals are covered by one access control tree is.

During the process of describing the information processing apparatus according to the embodiment of the present disclosure, obviously some processes and methods are disclosed. Subsequently, an information processing method according to an embodiment of the present disclosure is described without repeating specific details described above.

Figure 4:
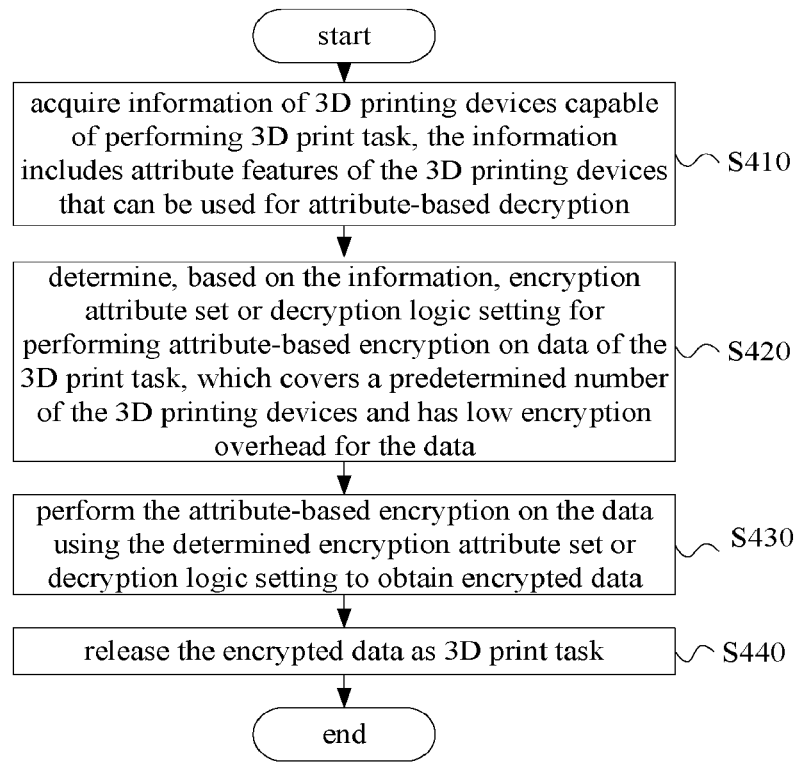
FIG. 4 shows a flowchart of an example of a process of an information processing method according to an embodiment of the present disclosure.

As shown in FIG. 4, an information processing method according to an embodiment of the present disclosure includes the following steps.

In step S410, information of 3D printing devices capable of performing a 3D print task is acquired, where the information includes attribute features of the 3D printing devices that can be used for attribute-based decryption.

In step S420, based on the information, an encryption attribute set or a decryption logic setting for performing an attribute-based encryption on data of the 3D print task is determined, where the encryption attribute set or the decryption logic setting covers a predetermined number of the 3D printing devices and has a low encryption overhead for the data.

In step S430, the attribute-based encryption is performed on the data using the determined encryption attribute set or decryption logic setting to obtain encrypted data.

In step S440, the encrypted data is released as a 3D print task.

Figure 17:
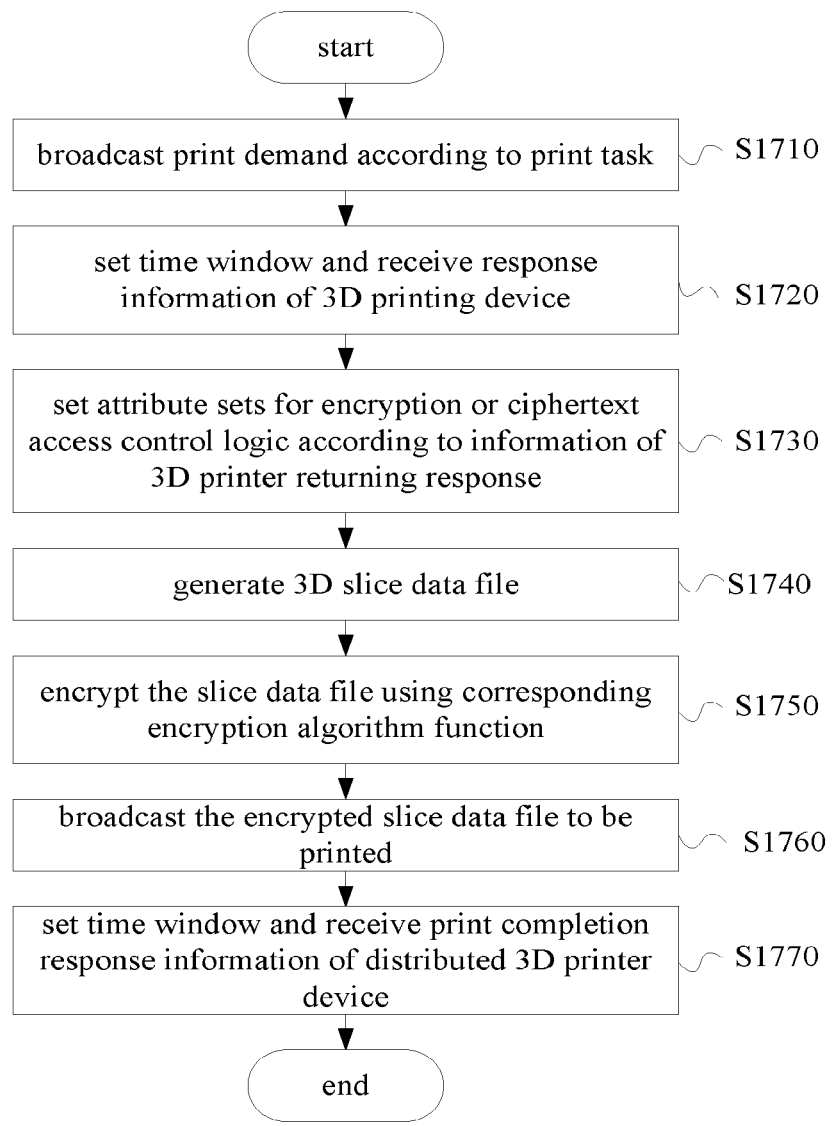
FIG. 17 shows a flowchart of an exemplary process performed at a 3D printing service device.

Subsequently, a specific exemplary process of an information processing method according to an embodiment of the present disclosure is illustrated with reference to FIG. 17. It should be understood that, the present disclosure is not limited to specific details in the following examples.

In step S1710, a print demand is broadcasted according to a print task.

In step S1720, a time window is set and response information of a 3D printing device is received.

In step S1730, according to information of a 3D printing device returning the response such as a printer ID and a printer type, a decision making model sets an attribute set for encryption or ciphertext access control logic according to the print task and information of an on-line 3D printer terminal based on a type of an encryption algorithm known for a print service device (such as a ciphertext policy or a key policy) and information of a registered 3D printer.

In step S1740, according to the print demand or task, the selected 3D printer, a classification list and a slice software library known for the print service device, 3D slice data files for different classifications are generated respectively.

In step S1750, according to an encryption algorithm library known to the print service device, the classified slice data files are encrypted using a respective encryption algorithm function based on algorithms and the set attribute parameters.

In step S1760, the encrypted slice data files to be printed are broadcasted.

In step S1770, a time window is set and print completion response information of a distributed 3D printing device is received.

Embodiments of the information processing apparatus and method for a 3D print service end are described above. In addition, the embodiments of the present disclosure further include an apparatus and method for a 3D printing device end. Subsequently, embodiments of an information processing apparatus and method for a 3D printing device end are described without repeating details corresponding to the embodiments of the 3D print service end.

Figure 5:
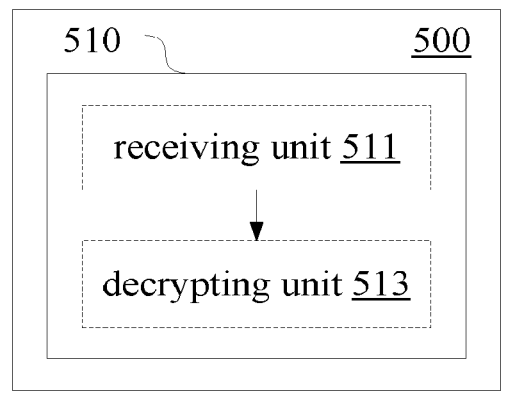
FIG. 5 shows a block diagram of a configuration example of an information processing apparatus according to an embodiment of the present disclosure.

As shown in FIG. 5, an information processing apparatus 500 according to an embodiment includes a processing circuit 510. The processing circuit 510 includes a receiving unit 511 and a decryption unit 513.

The receiving unit 511 is configured to perform control to receive encrypted data for a 3D print task. The data is attribute-based encrypted using an encryption attribute set or a decryption logic setting, where the encryption attribute set or decryption logic setting covers a predetermined number of 3D printing devices and has a low encryption overhead for the data.

The decrypting unit 513 is configured to decrypt the data using a decryption key based on attributed features.

The information processing apparatus according to the embodiment may be a 3D printing device, which corresponds to the distributed 3D printing device described in the above embodiments. Alternatively, the information processing apparatus according to the embodiment may be a user equipment. In a case that a link with the 3D printing device is established, the user equipment controls the 3D printing device to complete a 3D print task.

Figure 6:
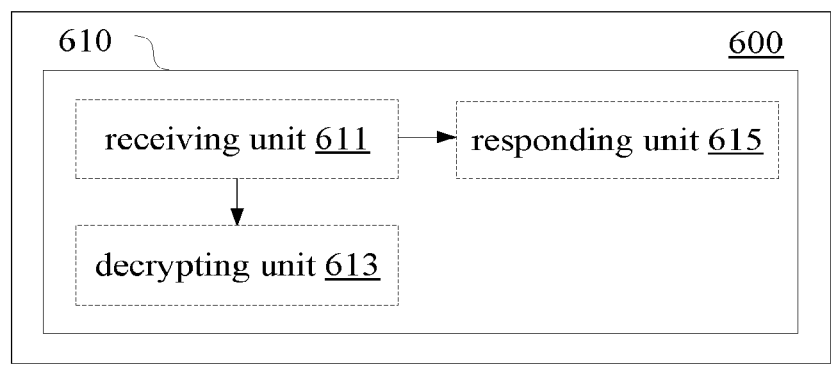
FIG. 6 shows a block diagram of a configuration example of an information processing apparatus according to another embodiment.

As shown in FIG. 6, an information processing apparatus 600 according to another embodiment includes a processing circuit 610. The processing circuit 610 includes a receiving unit 611, a decrypting unit 613 and a responding unit 615. Configurations of the receiving unit 611 and the decrypting unit 613 are similar to that of the receiving unit 511 and the decrypting unit 513 described with reference to FIG. 5 above.

In addition, the receiving unit 611 may be configured to perform control to receive broadcasted information on a demand of a 3D print task.

The responding unit 615 may be configured to perform control to make a response to the broadcasted information.

Figure 23:
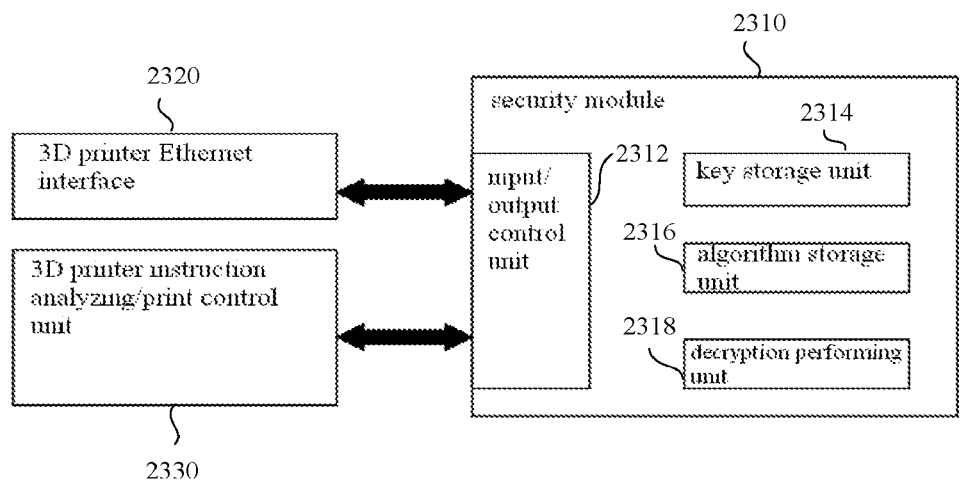
FIG. 23 shows a schematic diagram of a security module of a 3D printer terminal and its interface to a 3D printer.

In a case that the information processing apparatus according to the embodiment is implemented at the 3D printing device, as an example, the information processing apparatus may be implemented as a security module shown in FIG. 23.

As shown in FIG. 23, a security module 2310 includes: an input/output control unit 2312 configured to connect to a 3D printer Ethernet interface 2320 and a 3D printer instruction analyzing/print control unit 2330 to transceive data and perform print control; a key storing unit 2314 and an algorithm storing unit 2316 respectively configured to store keys and algorithms required by decryption; and a decryption performing unit 2318 configured to perform decryption on data.

Figure 7:
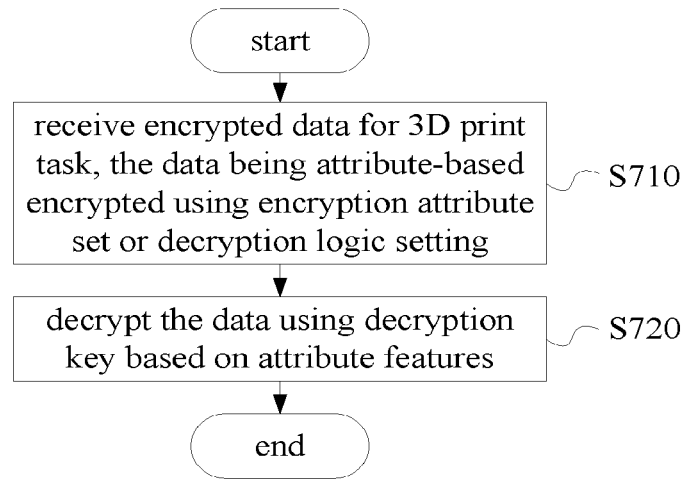
FIG. 7 shows a flowchart of an example of a process of an information processing method according to an embodiment of the present disclosure.

As shown in FIG. 7, according to an embodiment, an information processing method for a 3D printing device side includes the following steps.

In step S710, encrypted data for a 3D print task is received, where the data is attribute-based encrypted using an encryption attribute set or a decryption logic setting, and the encryption attribute set or decryption logic setting covers a predetermined number of 3D printing devices and has a low encryption overhead for the data.

In step S720, the data is decrypted using a decryption key based on attribute features.

As described above, the device decryption key of the 3D printer terminal may be provided by a key generation center as a third party, and the information processing apparatus for the printing device end according to the embodiment of the present disclosure may be implemented as a 3D printing device or a user equipment controlling a 3D printing device. Subsequently, examples of processing performed between a print service end, a printing device and a key generation center are described with reference to FIG. 11 to FIG. 16.

Figure 11:
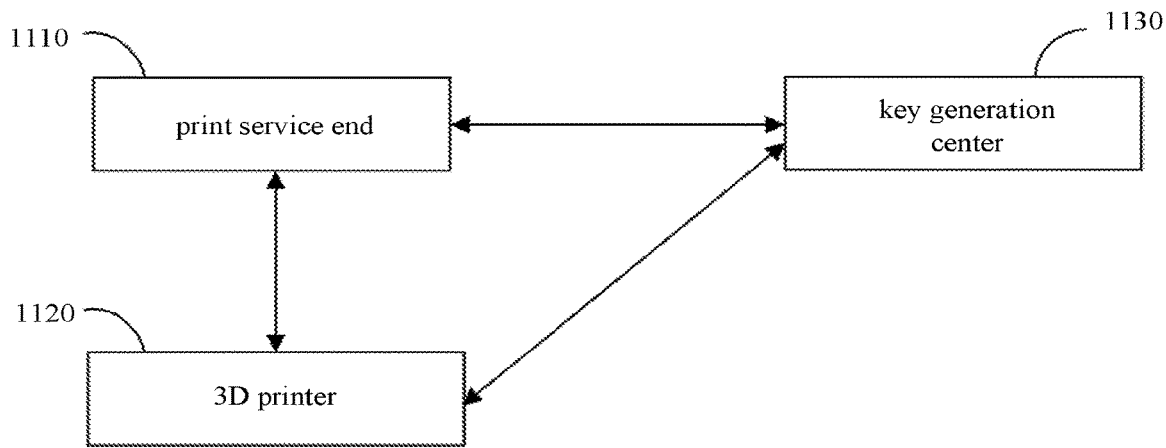
FIG. 11 shows a block diagram of a configuration example of a distributed 3D printing system.

FIG. 11 shows a schematic diagram of an exemplary connection relationship between a print service end 1110, a 3D printer 1120 and a key generation center 1130. The 3D printer 1120 may include multiple 3D printers.

Figure 12:
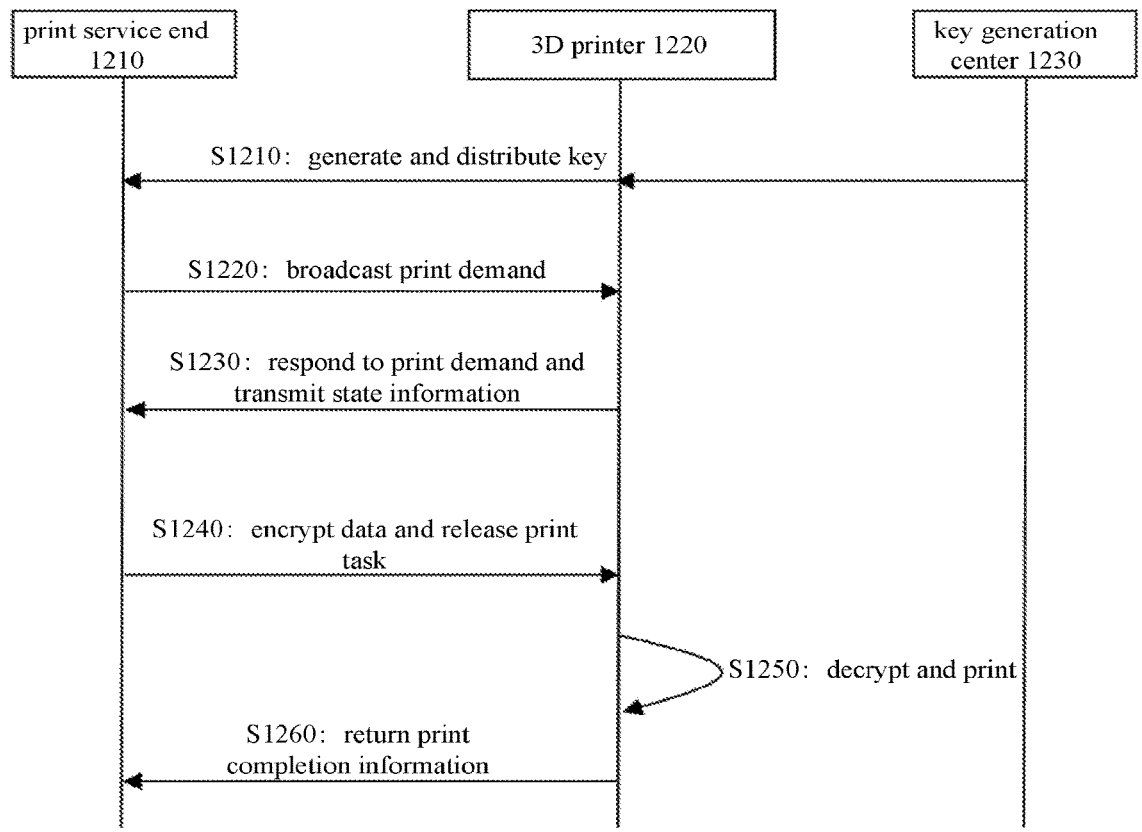
FIG. 12 shows a schematic diagram of a 3D print process performed in the exemplary distributed 3D printing system.

Referring to FIG. 12, in step S1210, a key generation center 1230 generates a key and distributes the key to a print service end 1210 and a 3D printer 1220.

Specifically, the key generation center is configured to generate a privacy parameter and a non-privacy parameter. The privacy parameter is used to generate a device decryption key provided to a 3D printer terminal, and the non-privacy parameter is used to encrypt information. The key generation center classifies, according to its set access structure, 3D printer terminals requesting for the device decryption key, so as to generate a corresponding device decryption key. The device decryption key may be configured in a security module of the 3D printer before delivery or may be imported by a user. In another case, when the 3D printing device registers to the print service end, the 3D print service end requests for the device decryption key from the key generation center in a unified manner. In this case, the 3D print service end may participate in setting attributes of the 3D printer terminal. The distributed 3D printer terminal may be configured with a security module configured to store cipher algorithms and keys, and perform a decryption operation and a data updating operation of the security module. The data updating operation includes importing and updating of an initial cipher algorithm, and importing and updating of an initial device decryption key. The key generation center may generate a device identity key of the distributed 3D printer terminal device according to information such as attributes and access policies. The device identity key and the corresponding attribute parameter may be transmitted to the distributed 3D printer terminal through a secret channel, and the device identity key may be preset in the distributed 3D printer terminal before delivery. The device identity key may also be downloaded and transmitted to a security storage medium of the distributed 3D printer terminal by a third party platform, through a download interface.

In step S1220, the print service end 1210 broadcasts a print demand. In step S1230, the 3D printer 1220 make responses to the print demand and transmits state information. In step S1240, the print service end 1210 encrypts data and releases a print task. In step S1250, the 3D printer 1220 decrypts data and performs printing. In step S1260, the 3D printer 1220 returns print completion information to the print service end 1210.

In addition, if the 3D printer terminal is not a network printing device and needs to be connected to the print service end by means of a client electronic apparatus such as a personal computer, a tablet computer and a mobile phone, the decryption operation and the decryption key may be configured in the client electronic apparatus.

Figure 13:
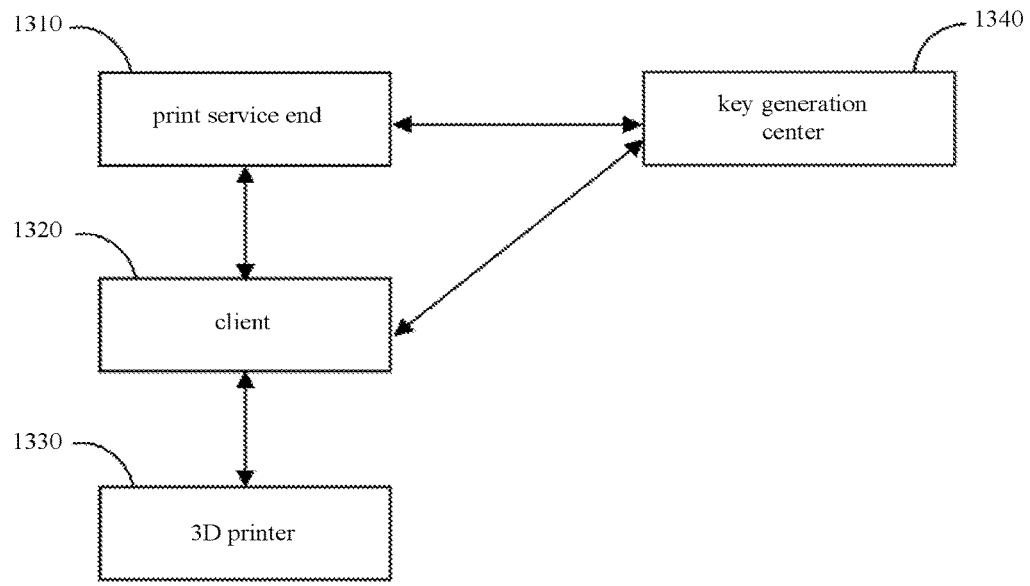
FIG. 13 shows a block diagram of another configuration example of the distributed 3D printing system.

FIG. 13 shows a schematic diagram of an exemplary connection relationship between a print service end 1310, a client 1320, a 3D printer 1330 and a key generation center 1340.

Figure 14:
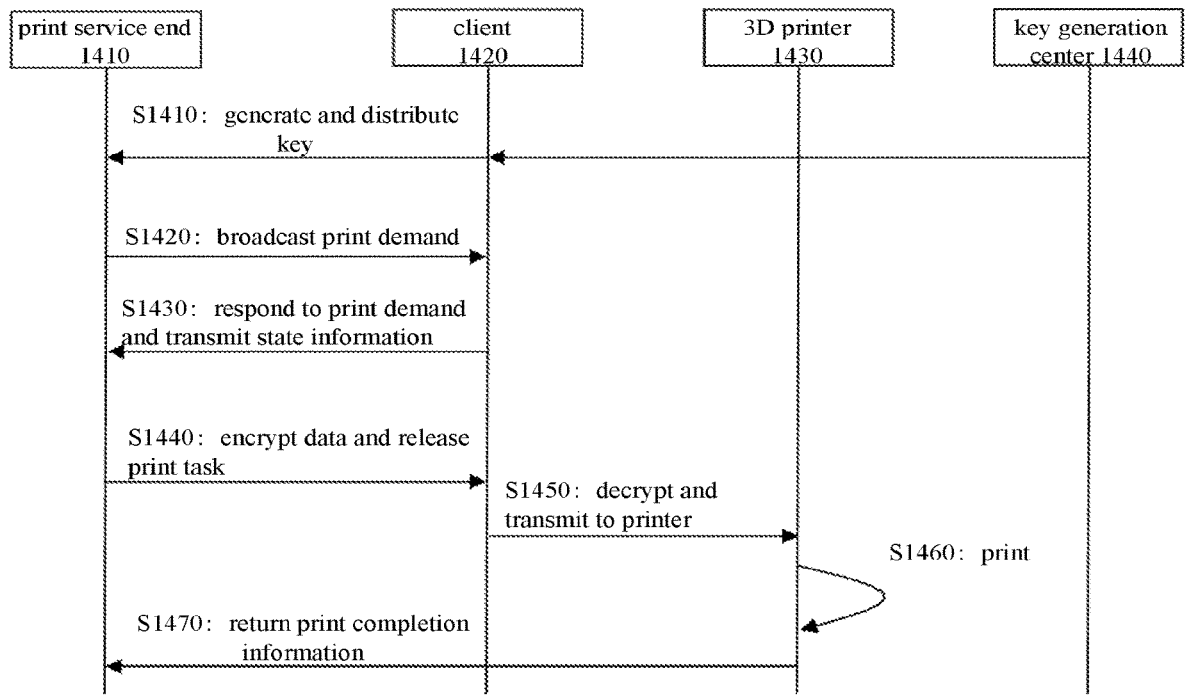
FIG. 14 shows a schematic diagram of a 3D printing process performed in the exemplary distributed 3D printing system.

Referring to FIG. 14, in step S1410, a key generation center 1440 generates a key and distributes the key to a print service end 1410 and a client 1420. In step 1420, the print service end 1410 broadcasts a print demand. In step S1430, the client 1420 makes responses to the print demand and transmits state information. In step S1440, the print service end 1410 encrypts data and releases a print task. In step S1450, the client 1420 decrypts the data and transmits the decrypted data to a 3D printer 1430. In step S1460, the 3D printer 1430 performs printing. In step S1470, print completion information is returned to the print service end 1410.

Figure 15:
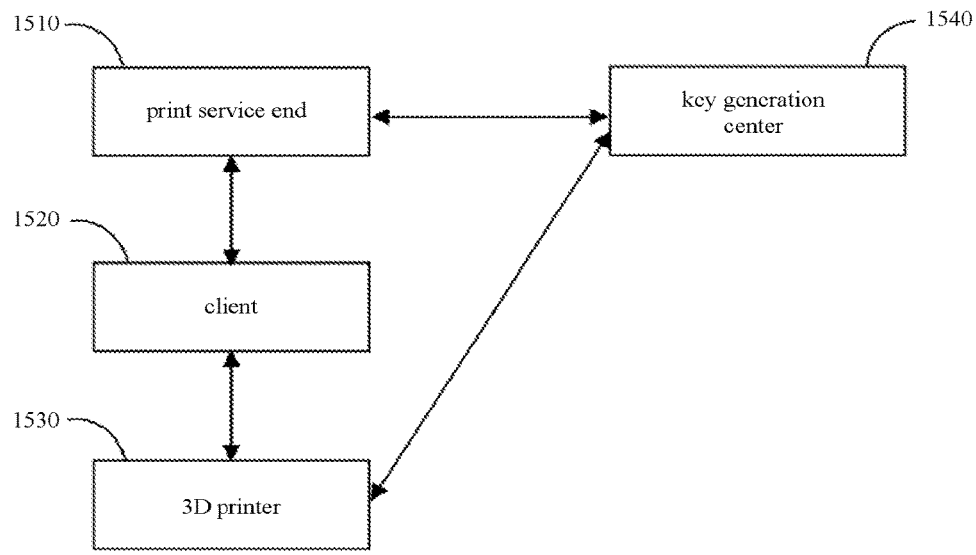
FIG. 15 shows a block diagram of another configuration example of the distributed 3D printing system.

FIG. 15 shows a schematic diagram of another exemplary connection relationship between a print service end 1510, a client 1520, a 3D printer 1530 and a key generation center 1540. Different from the example shown in FIG. 13, the key generation center 1540 provides the key to a 3D printer 1530 rather than the client 1520.

Figure 16:
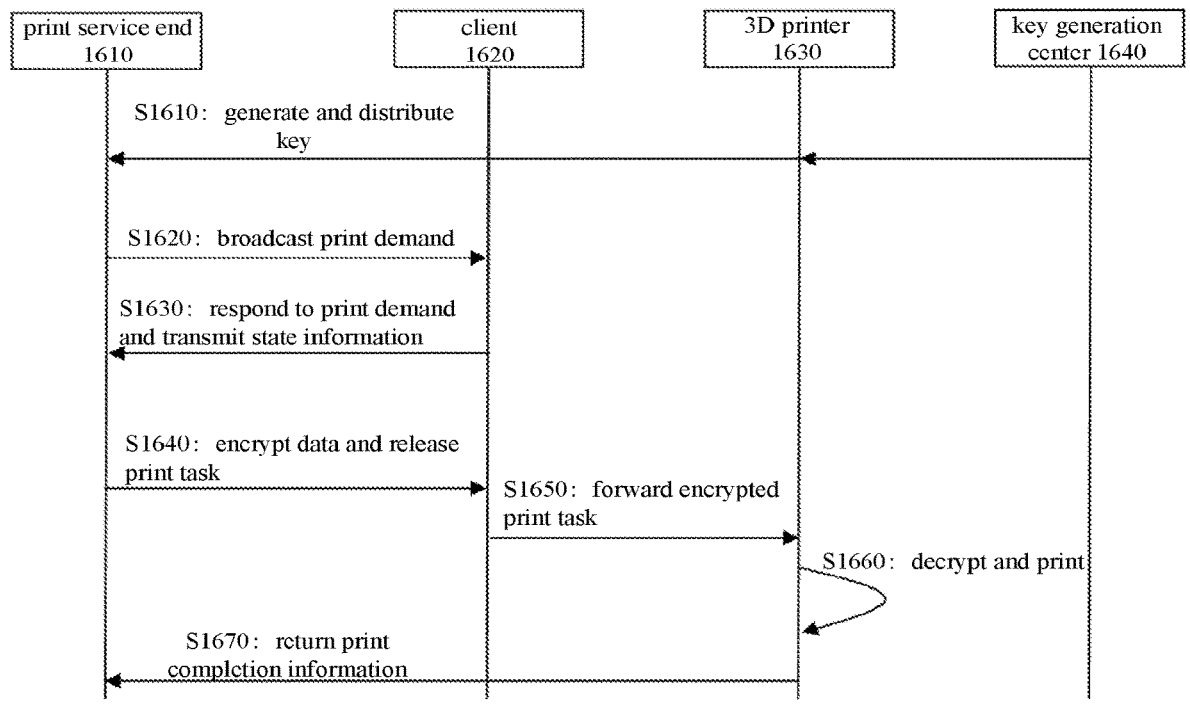
FIG. 16 shows a schematic diagram of a 3D printing process performed in the exemplary distributed 3D printing system.

Referring to FIG. 16, in step S1610, a key generation center 1640 generates a key and distributes the key to a print service end 1610 and a 3D printer 1630. In step S1620, the print service end 1610 broadcasts a print demand. In step S1630, a client 1620 makes responses to the print demand and transmits state information. In step S1640, the print service end 1610 encrypts data and releases a print task. In step S1650, the client 1620 decrypts data and transmits the decrypted data to the 3D printer 1630. In step S1660, the 3D printer 1630 performs printing. In step S1670, print completion information is returned to the print service end 1610.

Next, an example of processing performed between a print service end and a printer is described with reference to FIG. 21. It should be understood that, the present disclosure is not limited to details in the following examples.

Figure 21:
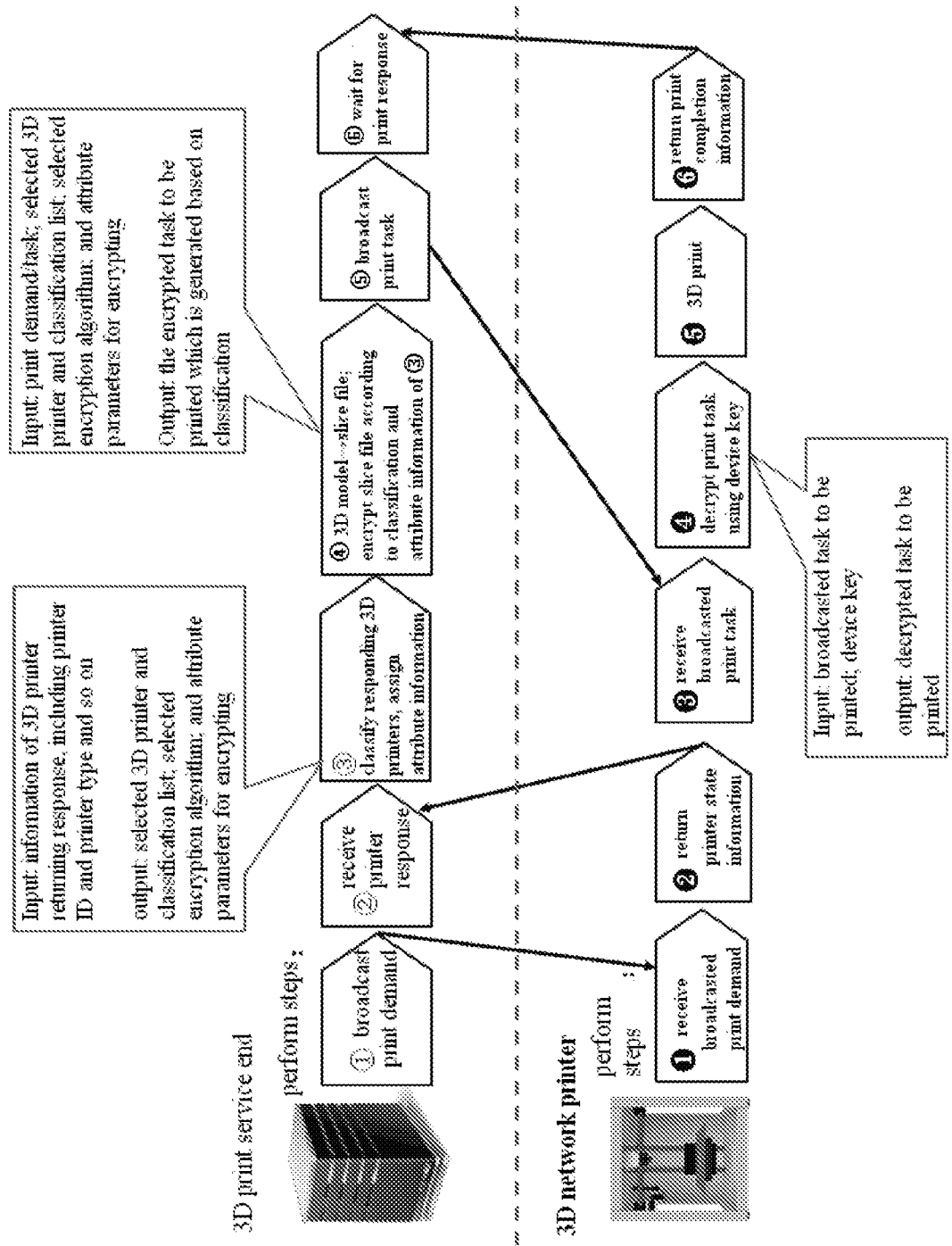
FIG. 21 shows a schematic diagram illustrating exemplary operating processes and communication interactions of a distributed 3D printing system.

As shown in FIG. 21, firstly, a 3D print service end broadcasts a print demand, which may include a print task ID, estimated print time for each 3D object and a time window and so on.

Subsequently, a distributed 3D printer terminal device receives the broadcasted information and returns a response. The response information may include information of the 3D printer device, such as a device type and a printer ID (which may be consistent with or associated with a device ID during initialization), where the corresponding non-privacy attribute parameter may be optional.

Subsequently, the 3D print service end receives the response. The 3D print service end may receive and count response information returned by distributed 3D printer terminals within the time window. After the time window is closed, the counted devices function as candidates participating in printing. The 3D print service end can count at least registered IDs and IP address information of 3D printer devices (the IP of a device with a single registration ID may be non-fixed).

Subsequently, the 3D print service end classifies and arranges the response information, and determines encryption attribute logic. As shown in FIG. 22, for example for a decision making model D=F (PT, RI, CAL, R3DI, 3D&S), inputs of the decision making model include a task to be printed, returned 3D printer information, an encryption algorithm library configured for the 3D print service end, a registered 3D printer information library, a 3D printer type and a slice software library, and the decision making model sets the encryption attribute logic. The 3D printer type and the slice software library are used when an encrypted slice file is downloaded, and the input item may be ignored when an encrypted 3D model file is directly downloaded.

In order to achieve the least encryption operation and the smallest communication bandwidth, the print service end temporarily combines, according to the published parameter information of the 3D printer terminal, on-line 3D printer terminals for a print task by controlling the attributes, and the number of combined 3D printer terminals is the least number of times of encryption of the 3D model print task. The final print encryption combination is composed of several parallel decryption groups, and the 3D printer terminal is a member of a certain group. Firstly, a root is set as OR logic; secondly, a greatest common divisor attribute is selected as a first-level logic input of the OR logic of the root. If the greatest common devisor attribute covers the whole print task amount, the root has only one first-level logic input and a next-level configuration is performed on the greatest common divisor attribute, so as to avoid that the number of the 3D printer terminals is larger than the print task amount. If a certain greatest common divisor attribute cannot cover the whole print task amount, a second first-level logic input for the OR logic of the root is further configured. Next, combination logic (OR, AND and so on) is configured in a non-greatest common devisor attribute, and 3D printer terminals are added to complete the remaining print task amount. If the second first-level logic input still cannot meet the print task amount, a third first-level logic input for the root is configured, and so on, until the number of the 3D printer terminals under coverage of the whole root matches the 3D print task amount. Practically, for encrypting a non-3D model file, i.e., in a case of encrypting a slice file, if a slice file is to be encrypted, slice files for 3D printers of different manufacturers/models may be not compatible. The decision making model according to the embodiment of the present disclosure may take the slice type as a control factor. In generating first-level logic inputs of the root, a classification of the slice file is considered. If multiple types of slice formats which are not compatible appear in a same print task, the first-level logic input amount of the root is further divided, i.e., increasing an encryption task amount and a transmission bandwidth of the 3D print service end. The 3D print service end performs real-time encryption according to the number of the first-level logic inputs of the root, i.e., generating the same number of ciphertext as the number of the first-level inputs. The decision making model outputs the encryption control logic.

If an encrypted slice file is to be downloaded, the 3D print service end processes 3D model slices of an attribute group for each first-level input according to the encryption control logic output by the decision making model and a corresponding slicing tool. The 3D print service end encrypts a 3D slice file or a 3D model file to generate an encrypted file to be printed by using algorithms in the encryption algorithm library, according to the encryption control logic output by the decision making model and the attribute group of each first-level input, i.e., a logic structure of attribute sets.

Referring to FIG. 21 again, subsequently, the 3D print service end broadcasts the encrypted slice data file to be printed, which may include a data file to be printed and a time window.

Subsequently, the distributed 3D printer terminal device receives the broadcasted information, and finds a ciphertext corresponding to its device identity key according to attributed information attached to the ciphertext.

Subsequently, the distributed 3D printer terminal device performs decryption and printing. The distributed 3D printer device obtains the slice data file to be printed using the device decryption key, so as to perform 3D printing.

After the printing is completed, print completion response information may be transmitted online to the 3D print service end, and the printed 3D object is transferred. If the 3D model file is to be encrypted, a slicing operation needs to be performed at the 3D printer device end.

The 3D print service end receiving the print completion response includes that: within a predetermined time window, the 3D print service end receives print completion responses of all distributed 3D printer terminal devices participating in printing. Accordingly, a manager of the 3D print service end is in charge of receiving the returned printed 3D object. Practically, if it needs to pay for the printing, the 3D print service end pays for an owner of the distributed 3D printer terminal which prints and submits the 3D object.

Figure 8:
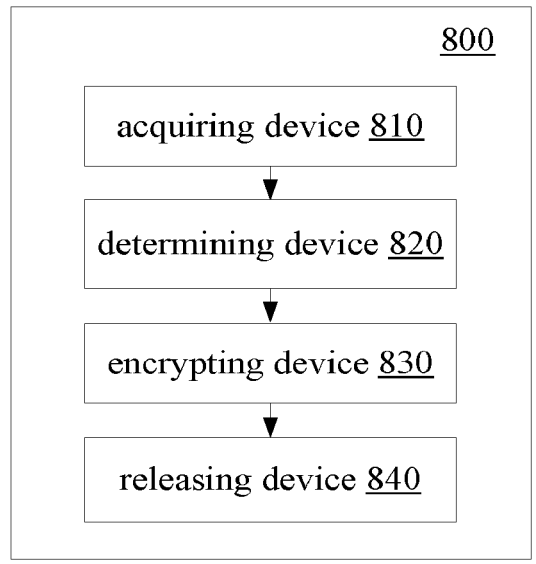
FIG. 8 shows a block diagram of a configuration example of an information processing apparatus according to an embodiment of the present disclosure.

FIG. 8 shows an information processing apparatus 800 for a 3D print service end according to an embodiment. The information processing apparatus 800 includes: an acquiring device 810 configured to acquire information of 3D printing devices capable of performing a 3D print task, where the information includes attribute features of the 3D printing devices that can be used for attribute-based decryption; a determining device 820 configured to determine, based on the information, an encryption attribute set or a decryption logic setting for performing an attribute-based encryption on data the 3D print task, where the encryption attribute set or the decryption logic setting covers a predetermined number of the 3D printing devices and has a low encryption overhead for the data; an encrypting device 830 configured to perform the attribute-based encryption on the data using the determined encryption attribute set or decryption logic setting to obtain encrypted data; and a releasing device 840 configured to perform control to release the encrypted data as a 3D print task.

Figure 9:
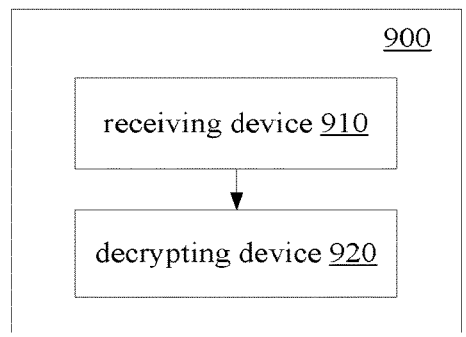
FIG. 9 shows a block diagram of a configuration example of an information processing apparatus according to another embodiment of the present disclosure.

FIG. 9 shows an information processing apparatus 900 for a 3D printing device end according to an embodiment. The information processing apparatus 900 includes: a receiving device 910 configured to perform control to receive encrypted data for a 3D print task, where the data is attribute-based encrypted using an encryption attribute set or a decryption logic setting and the encryption attribute set or decryption logic setting covers a predetermined number of 3D printing devices and has a low encryption overhead for the data; and a decrypting device 920 configured to decrypt the data using a decryption key based on attribute features.

As an example, various steps of the methods above and various modules and/or units of the devices above may be implemented as software, firmware, hardware or a combination thereof. In a case of implementing by software or firmware, programs consisting of the software for implementing the methods above are installed to a computer with a dedicated hardware structure (for example a general-purpose computer 1000 shown in FIG. 10) from the storage medium or the network. The computer can perform various types of functions when installed with various types of programs.

Figure 10:
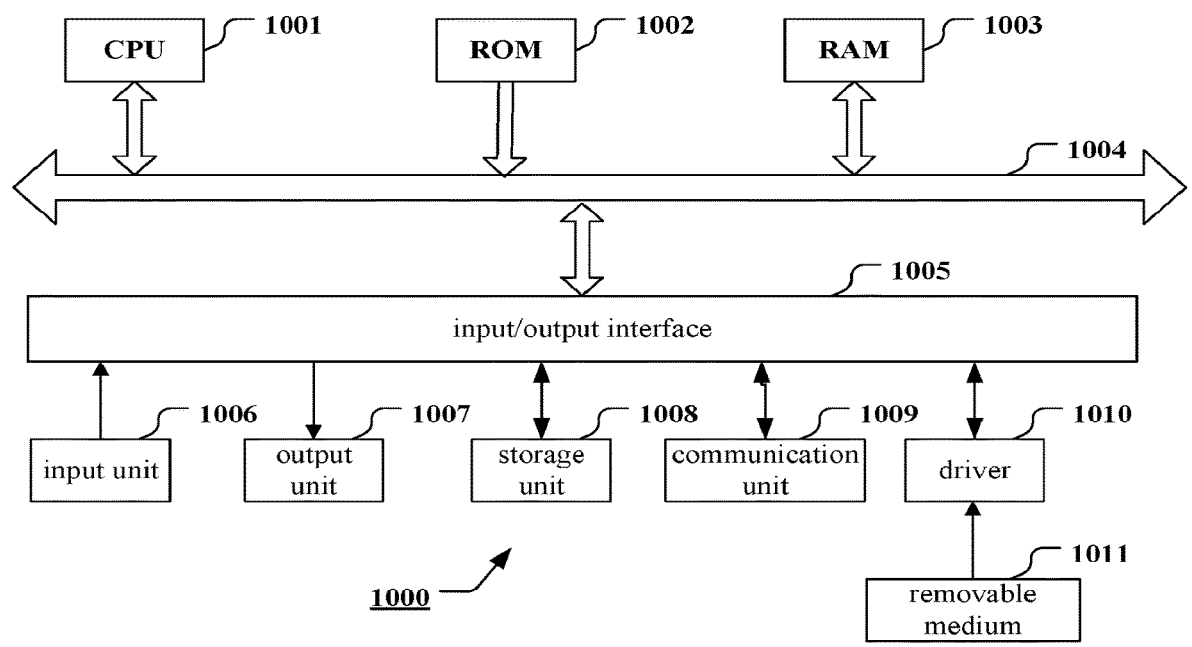
FIG. 10 shows a block diagram of an exemplary structure of a computer for implementing the method and apparatus according to the present disclosure.

In FIG. 10, a central processing unit (CPU) 1001 performs various types of processing according to programs stored in a read only memory (ROM) 1002 or programs loaded from a storage unit 1008 to a random access memory (RAM) 1003. Data required when the CPU 1001 performs various types of processing is stored in the RAM 1003 as needed. The CPU 1001, the ROM 1002 and the RAM 1003 are connected to each other via a bus 1004. An input/output interface 1005 is also connected to the bus 1004.

The following components are connected to the input/output interface 1005: an input unit 1006 (including a keyboard, and a mouse and so on), an output unit 1007 (including a display, for example a cathode ray tube (CRT) and a liquid crystal display (LCD), and a loudspeaker), a storage unit 1008 (including a hard disk and so on), and a communication unit 1009 (including a network interface card for example a LAN card, and a modem). The communication unit 1009 performs communication processing via a network for example the Internet. A driver 1010 may also be connected to the input/output interface 1005 as needed. A removable medium 1011 for example a magnetic disk, an optical disk, a magnetic-optical disk and a semiconductor memory may be installed on the driver 1010 as needed, such that computer programs read from the removable medium 1011 are installed on the storage unit 1008 as needed.

In a case of performing the series of processing described above by software, programs consisting of the software are installed from the network for example the Internet or the storage medium for example the removable medium 1011.

Those skilled in the art should understand that the storage medium is not limited to the removable medium 1011 shown in FIG. 10 which stores programs and is distributed separately from the device to provide the programs to the user. Examples of the removable medium 1011 include: a magnetic disk (including a floppy disk (registered trademark), an optical disk (including a compact disk (CD)-ROM) and a digital versatile disk (DVD), a magnetic-optical disk (including a mini disk (MID) (registered trademark)), and a semiconductor memory. Alternatively, the storage medium may be a hard disk included in the ROM 1002 and the storage unit 1008 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is also included in the present disclosure. The storage medium includes but not limited to a floppy disk, an optical disk, a magnetic-optical disk, a storage card and a memory stick and so on.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. Therefore, the changes, improvements or equivalents should be regarded as falling within the protection scope of the present disclosure.

The invention claimed is:

1. An information processing apparatus, comprising:
a processing circuit configured for:
acquiring information of 3D printing devices which are competent to a 3D print task, wherein the information comprises attribute features of the 3D printing devices that are capable of applying to an attribute-based decryption;
determining, based on the acquired information, an encryption attribute set or a decryption logic setting for performing an attribute-based encryption on data of the 3D print task, wherein the encryption attribute set or the decryption logic setting covers a specified number of the 3D printing devices and has a low encryption overhead for the data;
performing the attribute-based encryption on the data using the determined encryption attribute set or decryption logic setting to obtain encrypted data; and
performing control to release the encrypted data as a 3D print task,
wherein the determining comprises:
a) setting a root as an OR logic;
b) selecting a greatest common divisor attribute as a first-level logic input of the OR logic, the root having only one first-level logic input when the greatest common divisor attribute is capable of covering an overall 3D print task amount, wherein the greatest common divisor attribute is an attribute common to a largest number of 3D printing devices in one print task; and
c) further configuring another first-level logic input of the OR logic of the root when the number of the 3D printing devices under coverage of the root is less than the 3D print task amount, until the number of the 3D printing devices under coverage of the root matches the 3D print task amount.

2. The information processing apparatus according to claim 1, wherein the encryption overhead comprises the number of times of encryption operations to be performed for the specified number of the 3D printing devices, and/or a communication bandwidth required for transmitting the encrypted data.

3. The information processing apparatus according to claim 1, wherein the determining comprises grouping the 3D printing devices based on the attribute features of the 3D printing devices, wherein each group of the 3D printing devices corresponds to a common encryption operation.

4. The information processing apparatus according to claim 1, wherein in a case where the root has only one first-level logic input and the number of 3D printing devices corresponding to the first-level logic input is larger than the 3D print task amount, the operation b) further comprises: performing a next-level logic configuration for the first-level logic input, such that the number of the 3D printing devices corresponding to the first-level logic input matches the 3D print task amount.

5. The information processing apparatus according to claim 1, wherein the number of times of the encryption performed on the data corresponds to the number of first-level logic inputs of the root.

6. The information processing apparatus according to claim 1, wherein the 3D printing devices comprise 3D printing devices registered in advance at the information processing apparatus.

7. The information processing apparatus according to claim 1, wherein the processing circuit is further configured for:
performing control to broadcast a demand for the 3D print task via a network; and
performing control to receive a response of a 3D printing device to the demand.

8. The information processing apparatus according to claim 1, wherein the processing circuit is configured for selecting 3D printing devices for the present 3D print task according to 3D print tasks previously performed by the 3D printing devices and/or an estimated performing time of the present 3D print task, in a case where the number of 3D printing devices which are competent to the 3D print task is larger than the 3D print task amount.

9. The information processing apparatus according to claim 1, wherein the processing circuit is configured for selecting 3D printing devices for the 3D print task according to the number of attribute features of the 3D printing devices that are capable of applying to the attribute-based decryption, in a case where the number of 3D printing devices which are competent to the 3D print task is larger than the 3D print task amount.

10. The information processing apparatus according to claim 1, wherein the data comprises a 3D model file or a slice file generated based on a 3D model file.

11. An information processing method, comprising:
acquiring information of 3D printing devices which are competent to a 3D print task, wherein the information comprises attribute features of the 3D printing devices that are capable of applying to an attribute-based decryption;

determining, based on the acquired information, an encryption attribute set or a decryption logic setting for performing an attribute-based encryption on data of the 3D print task, wherein the encryption attribute set or the decryption logic setting covers a specified number of the 3D printing devices and has a low encryption overhead for the data;

performing the attribute-based encryption on the data using the determined encryption attribute set or decryption logic setting to obtain encrypted data; and releasing the encrypted data as a 3D print task, wherein the determining comprises:

a) setting a root as an OR logic;

b) selecting a greatest common divisor attribute as a first-level logic input of the OR logic, the root having only one first-level logic input when the greatest common divisor attribute is capable of covering an overall 3D print task amount, wherein the greatest common divisor attribute is an attribute common to a largest number of 3D printing devices in one print task; and c) further configuring another first-level logic input of the OR logic of the root when the number of the 3D printing devices under coverage of the root is less than the 3D print task amount, until the number of the 3D printing devices under coverage of the root matches the 3D print task amount.

* * * * *